United States Patent
Sivanesan et al.

(10) Patent No.: US 12,375,978 B2
(45) Date of Patent: Jul. 29, 2025

(54) PHYSICAL LAYER TECHNIQUES TO MITIGATE THE HANDOVER PROCESS VULNERABILITIES

(71) Applicant: Intel Corporation, Santa Clara, CA (US)

(72) Inventors: Kathiravetpillai Sivanesan, Portland, OR (US); Christian Maciocco, Portland, OR (US); Rath Vannithamby, Portland, OR (US); Liuyang Lily Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 706 days.

(21) Appl. No.: 17/483,912

(22) Filed: Sep. 24, 2021

(65) Prior Publication Data
US 2023/0095401 A1 Mar. 30, 2023

(51) Int. Cl.
*H04L 12/00* (2006.01)
*H04W 36/00* (2009.01)

(52) U.S. Cl.
CPC ... *H04W 36/0058* (2018.08); *H04W 36/0085* (2018.08)

(58) Field of Classification Search
CPC ......... H04W 36/0058; H04W 36/0085; H04W 12/06; H04W 36/0083; H04W 36/322; H04W 12/12
USPC ................................................. 370/332, 331
See application file for complete search history.

(56) References Cited

U.S. PATENT DOCUMENTS

| 2013/0183975 A1* | 7/2013 | Hyun | H04W 36/22 455/436 |
| 2015/0016414 A1* | 1/2015 | Hwang | H04W 36/0079 370/331 |
| 2018/0368034 A1* | 12/2018 | Lin | H04W 72/046 |

FOREIGN PATENT DOCUMENTS

| EP | 1784039 A2 * | 5/2007 | ........ H04W 36/0066 |
| EP | 1881720 A1 * | 1/2008 | ............ H04W 36/22 |
| WO | WO-2011065874 A1 * | 6/2011 | ............ H04W 36/24 |
| WO | WO-2016204676 A1 * | 12/2016 | ........ H04W 36/0058 |

* cited by examiner

*Primary Examiner* — Frantz Coby
(74) *Attorney, Agent, or Firm* — Schwegman Lundberg & Woessner, P.A.

(57) ABSTRACT

An apparatus and system to mitigate non-genuine handovers are described. The handovers include handovers based on fake measurements and handovers to malicious cells. To mitigate these, a mitigation procedure is initiated when excessive handovers are detected. Location information obtained from the UE, estimation of PHY layer properties by the serving and/or target cell, or AI modeling of the best serving cell at the UE location is used to determine whether the handover is valid. If not, the handover is canceled and the UE is stopped from initiating new handovers for a specified time, the UE may be instructed to perform re-authentication with the network, and/or the serving cell recommends to the network authentication entity to revoke the UE authentication. To ensure that the target cell is legitimate, an AI model is used to classify the target cell as known/unknown and the result sent to the network in NAS signaling.

20 Claims, 9 Drawing Sheets

US 12,375,978 B2

PHYSICAL LAYER TECHNIQUES TO MITIGATE THE HANDOVER PROCESS VULNERABILITIES

TECHNICAL FIELD

Embodiments pertain to wireless communications. In particular, some embodiments relate to handover in long-term evolution (LTE), fifth-generation (5G), or beyond network. In particular, some embodiments relate to the mitigation of handover vulnerabilities in networks.

BACKGROUND

The use and complexity of wireless systems, which include $4^{th}$ generation (4G) and $5^{th}$ generation (5G) networks among others, has increased due to both an increase in the types of devices user equipment (UEs) using network resources as well as the amount of data and bandwidth being used by various applications, such as video streaming, operating on these UEs. With the vast increase in the number and diversity of communication devices, the corresponding network environment, including routers, switches, bridges, gateways, firewalls, and load balancers, has become increasingly complicated, especially with the advent of next-generation (NG) (or new radio (NR)) systems. As expected, a number of issues abound with the advent of any new technology. One of the ever-present issues is security, which encompasses a wide variety of individual issues. One security issue that has become even more prevalent with the increased use of internet-of-things (IoT) devices, is distributed denial-of-service (DDOS) attacks. In particular, an avenue for DDOS attacks is handover of the UE, in which a malicious UE may be able to provide false data to a serving cell to initiate multiple handover procedures in a short amount of time, thereby wasting radio frequency resources.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
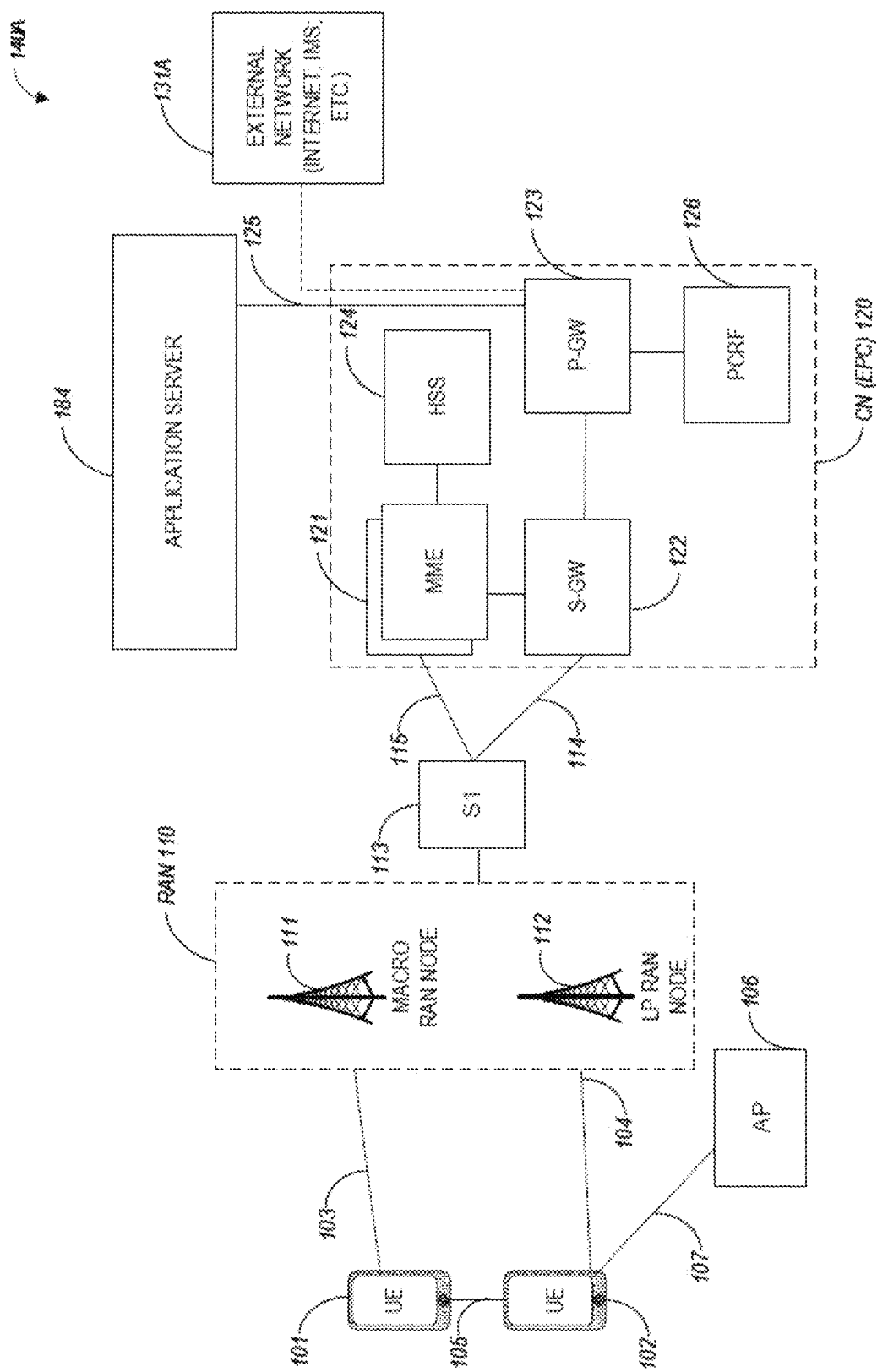
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below), in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SG1 interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet. IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
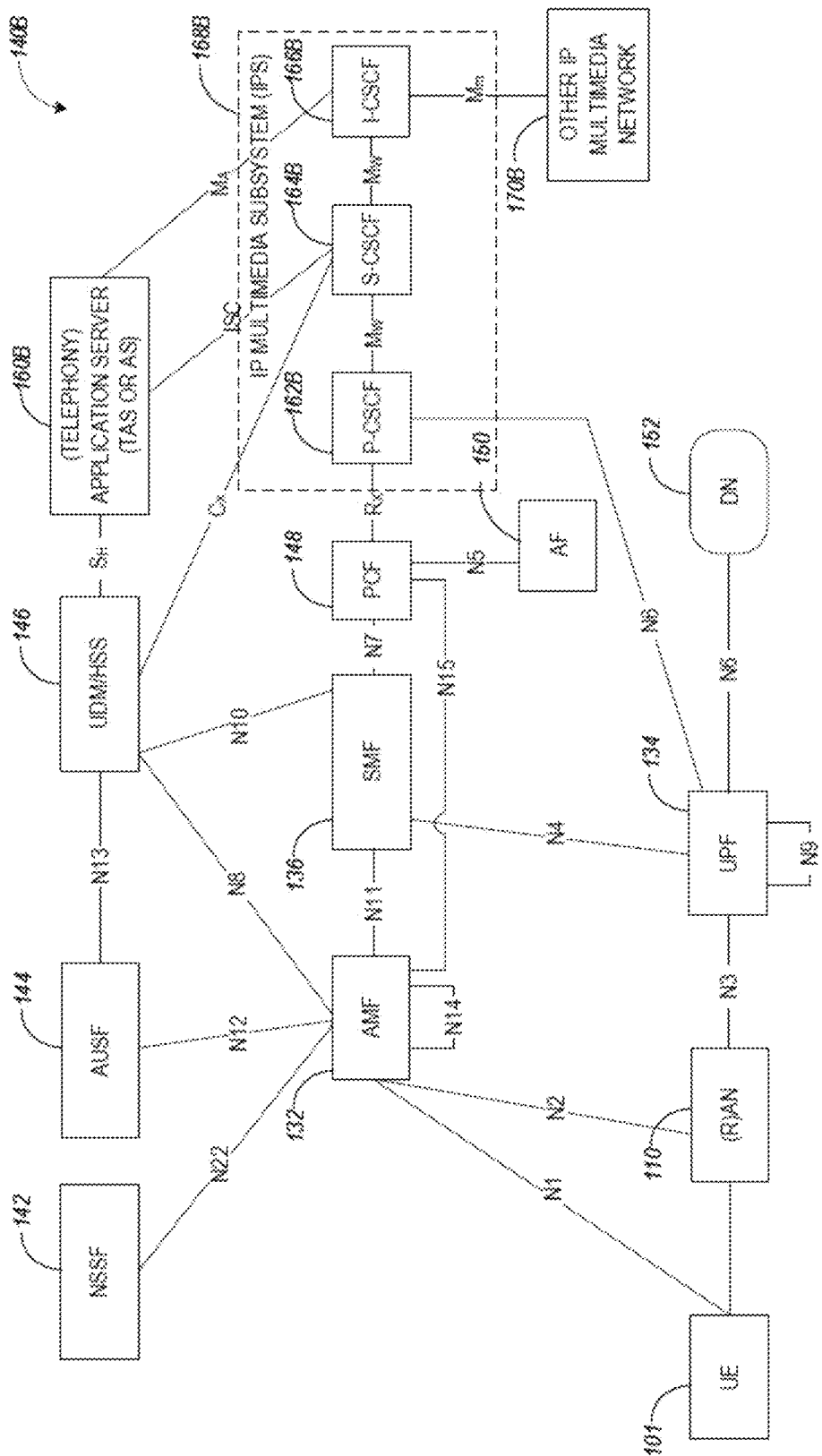
FIG. 1B illustrates a non-roaming 5G system architecture in accordance with some aspects.

FIG. 1B illustrates a non-roaming 5G system architecture in accordance with some aspects. In particular. FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150. UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134). N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
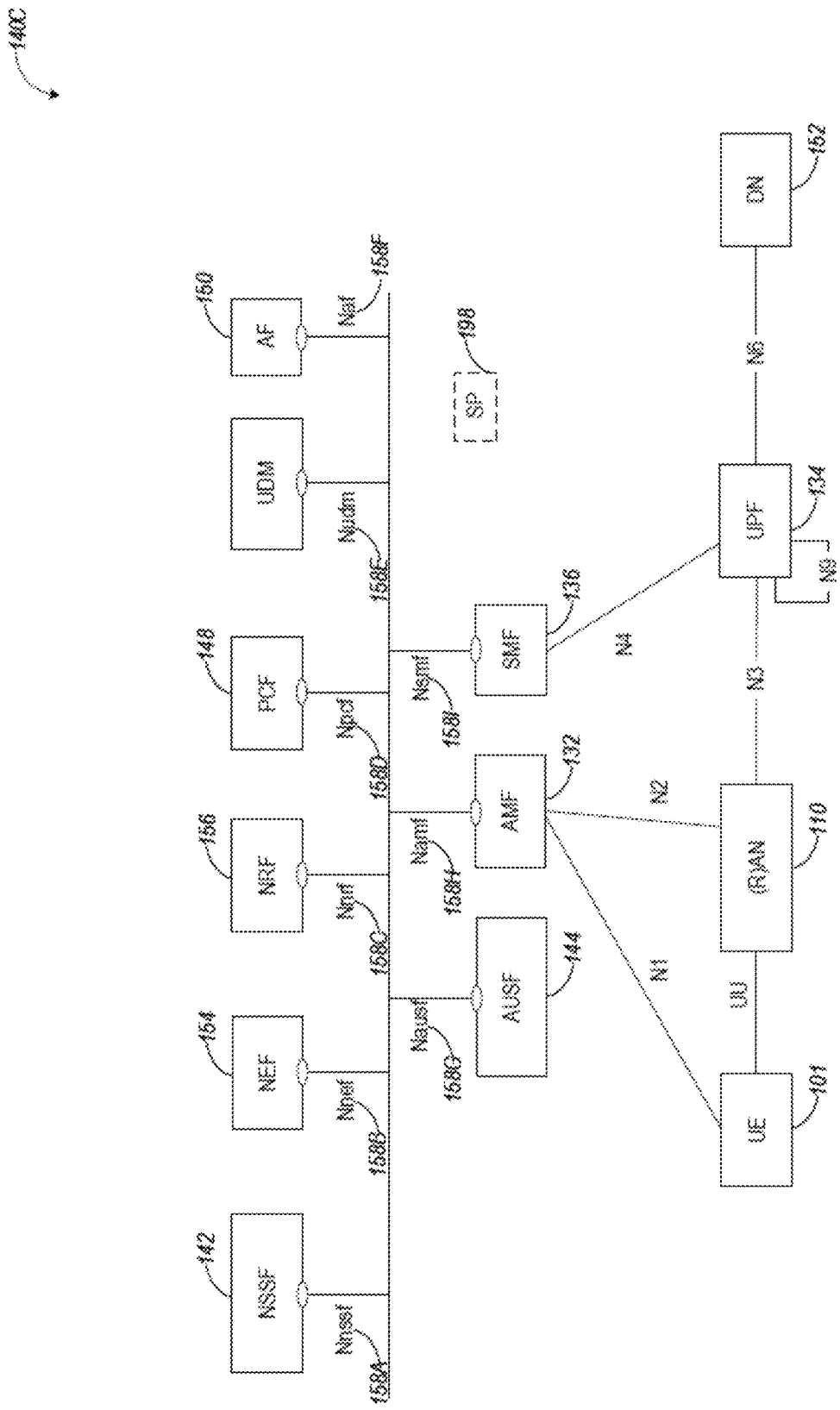
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142). Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
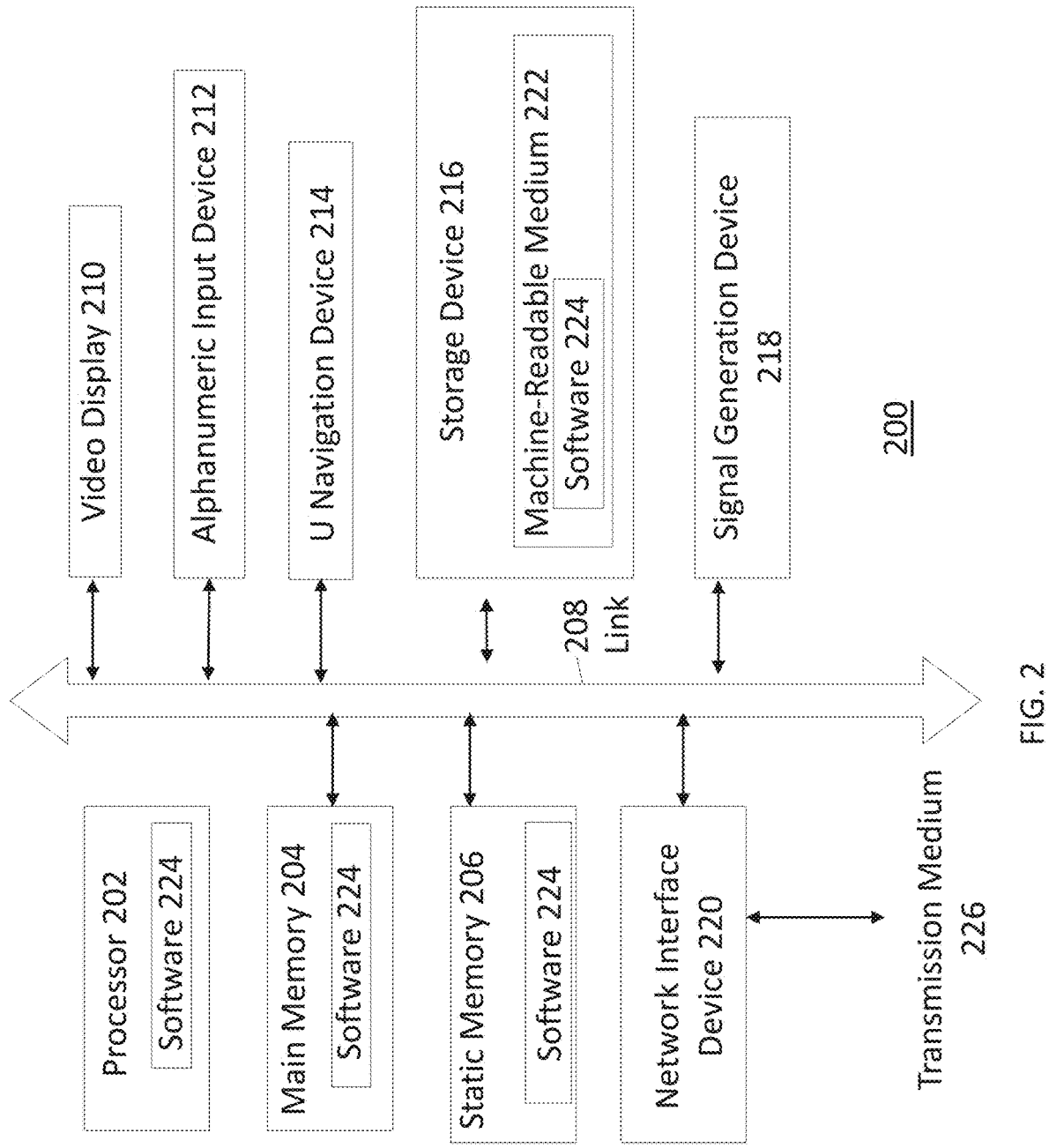
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks: magneto-optical disks: Random Access Memory (RAM): and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14). 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 50, 50, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS). Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11 ad. IEEE 802.11 ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5.905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz). IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC). OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP fifth generation (5G) communication systems, etc. Still, a UE may take this role as well and act as an AP, eNB, or gNB; that is some or all features defined for network equipment may be implemented by a UE.

As above, the radio frequency spectrum is a scarce resource whose availability is limited both temporally and in frequency. The resource strain has only increased with the increasing number and variety of services and applications, as well as devices such as IoT devices, being introduced. To provide adequate coverage, multiple cells may be introduced to an area. The number and the density of cells may be dependent on the environment; an urban environment or environment in which a significant amount of communications may occur (e.g., a stadium or arena) may have a larger number of cells than a rural environment.

The coverage of each cell is limited by the transmission power and the terrain/environment conditions, the latter of which is of an increasing issue for communications that use the 60 GHz band. UEs may be stationary or mobile; mobile UEs may leave one cell coverage area and move to an adjacent cell coverage area. A handover process is used to move the UE connection between cells. The handover process, however, introduces several security vulnerabilities to the cellular network, including both initiation of a fake handover process and the presence of a fake or compromised access node.

The first security vulnerability involves a device intentionally or unintentionally initiating an unnecessary handover process. This wastes valuable radio resources in the serving and target cells and may cause a DOS-based attack for genuine devices that would like to use handover to maintain service continuity. During the handover process, the UE makes periodic measurements such as Reference Signal Received Power (RSRP), Reference Signal Received Quality (RSRP) of reference signals from the serving cell and neighboring (target) cells. The measurements are transmitted to the serving cell in a measurement report, which then determines whether handover to one of the target cells is appropriate. Note that as used herein, the term "cell" and "base station" may be used synonymously. A base station may be an eNB, gNB, etc . . . .

A rogue device may provide false measurements in a measurement report to initiate the handover process. The serving cell may prepare for the handover by allocating radio and computing resources. The serving cell also alerts the target cell and may request the target cell to prepare for handover to provide uninterrupted service to the rogue device. During this process, the rogue device may terminate the handover process prior to completion. In response to the termination, the serving and target cell may free the allocated resources for the handover. After a small delay, the rogue device may again initiate the handover process and prematurely terminate the handover process. This may occur multiple times, wasting the radio resources of the serving and target cells and preventing other UEs from completing a legitimate handover process.

In other situations, the rogue device may complete the handover process based on the fake measurements provided in the measurement report and move to a target base station. In this case, the rogue device may reinitiate the handover process to move back to the original base station immediately or may select a new target base station and initiate the handover process to the new target base station based on a new set of fake measurements provided in the next measurement report. The above may cause DOS for legitimate devices.

On the other hand, instead of the UE being a rogue device, a fake or compromised access node may be present in a geographical location. The access node may be a small cell, pico cell, nano cell, or roadside unit, among others. Such a device may transmit reference signals and, in response, attract genuine UEs for a handover. However, the device may steal or spoof valuable information from genuine UEs.

Figure 3:
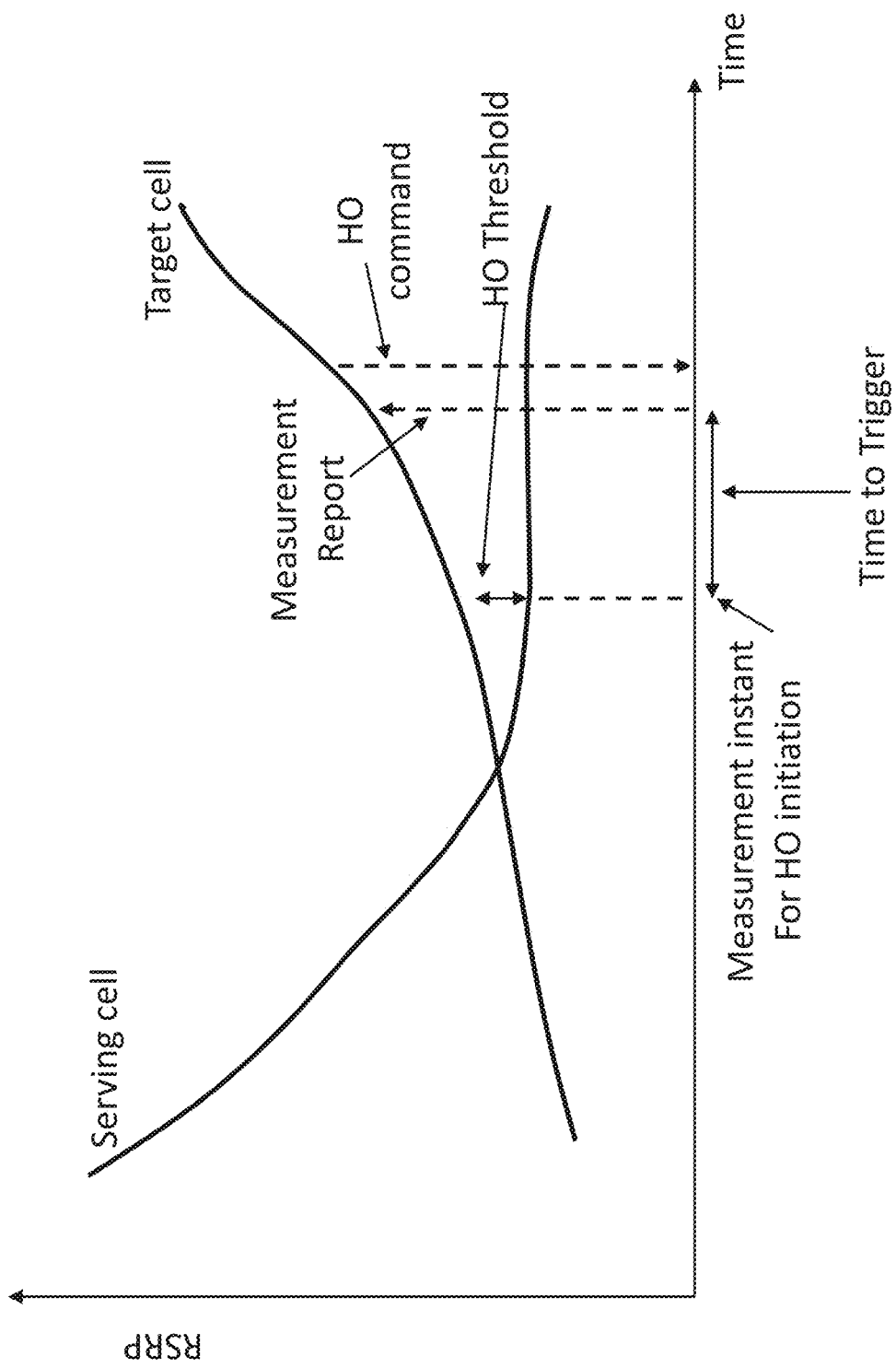
FIG. 3 illustrates a Reference Signal Received Power (RSRP) measurement profile of a handover in accordance with some aspects.

FIG. 3 illustrates an RSRP measurement profile of a handover in accordance with some aspects. As above, the handover process is typically initiated by the UE sending reports of signal power or quality (RSRP or RSRQ) of the current serving cell and the candidate target cells. As shown in FIG. 3, the handover process is triggered in response to the RSRP of the serving cell as measured by the UE is lower than a particular threshold (event A2) or the RSRP of the neighbor cell being higher than a particular threshold (event A4). In certain cases, the RSRP of the serving and neighbor cells may be compared (events 3, 5, and 6) and the handover process triggered accordingly. In this case, the use of a handover threshold provides a hysteresis that eliminates handover ping-ponging between the serving and target cells when the RSRPs are relatively close.

The measurement and reporting are based on event triggers that can be configured by the network. That is, as shown in FIG. 3, once the measurement threshold for reporting has been reached, the UE transmits a measurement report to the serving base station after the time to trigger reporting has been reached. The serving base station, in response, sends a handover command that directs the UE to handover to the target base station after confirming the availability of resources at the target serving base station via backhaul message exchanges between the serving and target base stations. The UE then reconnects to the target base station.

Figure 4:
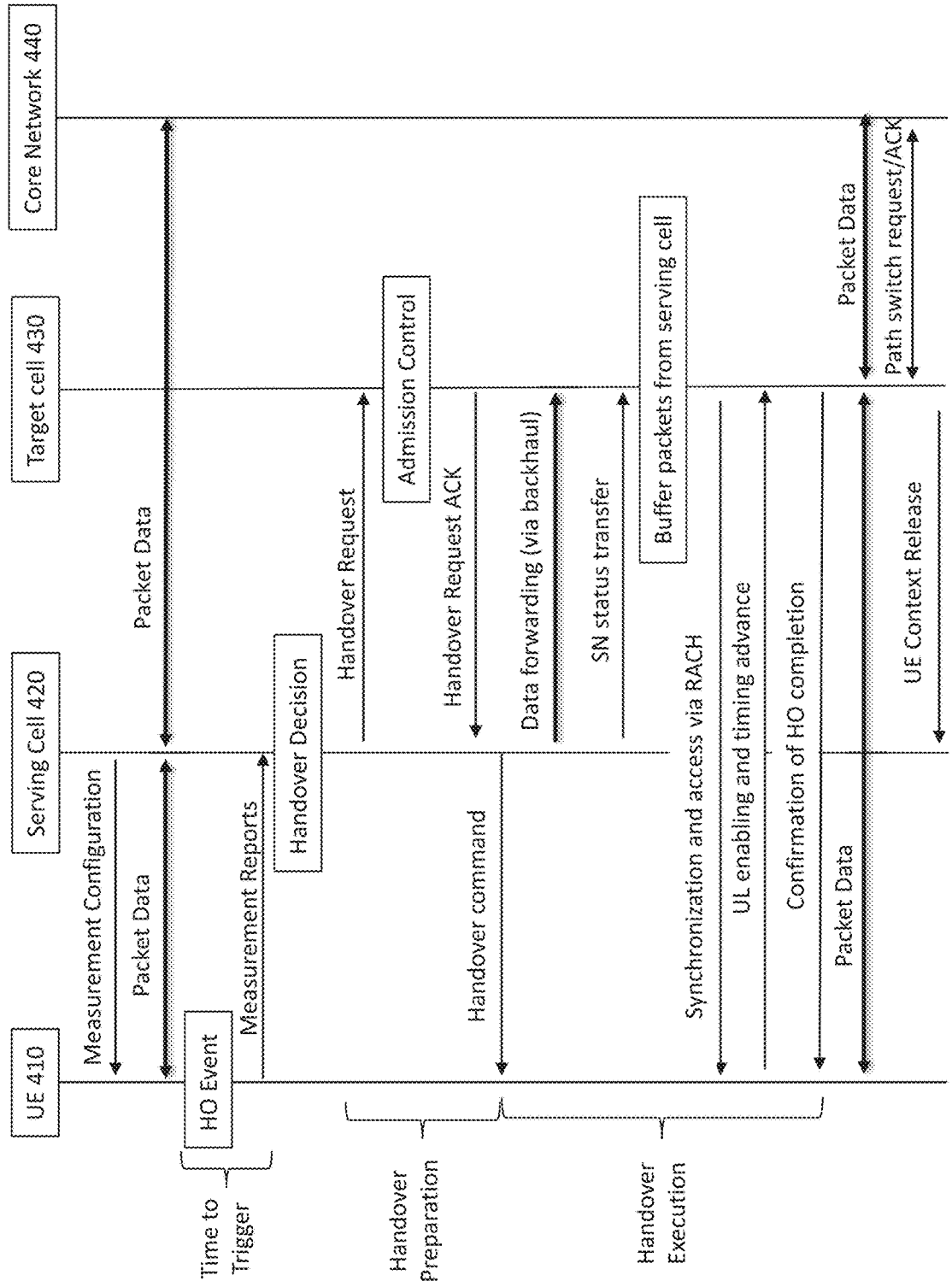
FIG. 4 illustrates a flow diagram of a handover (HO) process in accordance with some aspects.

FIG. 4 illustrates a flow diagram of a handover (HO) process in accordance with some aspects. As above, high mobility or dense environments with large numbers of (micro and other) cells may increase the frequency of a UE 410 engaging in the handover process. FIG. 4 illustrates a handover process 400 in accordance with some embodiments. The various components shown in FIG. 4 may be described in relation to the previous figures. Some of the processes that occur during handover may not be shown for convenience.

As shown, the serving cell 420 provides measurement configuration information to the UE 410 in an RRCConnectionReconfiguration message. The measurement configuration information includes the handover reporting thresholds as well as other handover parameters, such as the timing for periodic reporting. After establishing a connection with the serving cell 420, the UE 410 in connected mode may communicate uplink and downlink packet data with the serving cell 420, which may be sent through the core network 440 using the serving cell 420. Although not shown, the serving cell 420 may include a 5G open radio access network (ORAN) architecture, which includes a distributed unit and a centralized unit.

The handover may be an inter- or intra-network handover. Independent of whether the handover is intra- or inter-network, the handover process may take a number of operations, and it may overall take a significant amount of time to complete the operations involved in the handover process. These operations may include, for example, a UE 410 in RRC Connected mode measuring signal and/or channel qualities of reference signals transmitted by a serving cell 420 to which the UE 410 is attached. The measurements may include, for example, signal-to-noise ratio measurements (SINR), signal-to-interference ratio measurements (SIR), or bit error rate (BER), among others.

As above, the handover process is typically started by triggering the measurement from the UE 410 to the serving cell 420. For example, in LTE systems, the measurement for handover is normally triggered by Event A3. The RSRP or RSRQ is typically used as a metric to make the handover decisions. In some embodiments, the logic of handover event and parameters used in for making the decision are shown as the neighbor parameters become better than the serving cell parameters (after a preset offset). The handover event has a hysteresis parameter to avoid a racing condition. One handover entering condition is that the measurement in the neighboring cell−Hys>the measurement in the serving cell+Offset. The hysteresis and offset are parameters that may be conveyed in the RRCConnectionReconfiguration message. One handover leaving condition is that the measurement in the neighboring cell+Hys<the measurement in the serving cell+Offset. The measurement in the neighboring cell is the measurement result of the neighboring cell (measured in dBm or dB), not taking into account any offsets. The measurement in the serving cell is the measurement result of the neighboring cell (measured in dBm or dB), not taking into account any offsets. Hys is the hysteresis parameter for the event; Offset is the system-wide common offset parameter for the event. The Hys is a positive quantity and is used to prevent ping-pong and unnecessary handovers. The offset is used to specify a handover threshold or margin and generally is a positive quantity and common for all target cells and is referred to as A3 offset.

When a UE is moving towards another cell, if the target cell satisfies the entering condition, the entering condition is included in the neighbor cell measurement report list for the handover. If a UE is moving away from a cell and a leaving condition is satisfied, that cell is removed from the neighbor cell report list for the handover.

In response to the detection of a handover event as indicated by the RRCConnectionReconfiguration message, the UE 410 may generate one or more measurement reports and transmit the measurement reports to the serving cell 420.

The serving cell 420 may determine from the measurement report whether to initiate handover. If handover is to occur, the serving cell 420 may determine, based on the measurement report information, a target cell 430 to which to handover the UE. The serving cell 420 may then send a handover request containing UE context information to the target cell 430.

The target cell 430 may engage in admission control after receiving the handover request. Admission control may involve, among others, the target cell 430 determining whether to accept the UE 410, e.g., based on loading (or predicted loading) of the target cell 430, loading of one or more neighboring cells. After acceptance of the handover request of the UE 410, the target cell 430 may transmit to the serving cell 420 a handover request acknowledgment (ACK).

The serving cell 420 may, in response to reception of the handover request acknowledgment ACK, then send allocation and reconfiguration information to the UE 410 and instruct the UE 410 to perform handover to the target cell 430 via a handover command. The reconfiguration information may be sent in a RRCConnectionReconfiguration message that includes a handover command. The RRCConnectionReconfiguration message may include, for example, the mobilityControlInformation information element (IE), and the new Cell Radio Network Temporary Identifier (C-RNTI) of the target cell 430.

The serving cell 420 may begin forwarding data to the target cell 430 over a backhaul connection, where the data is buffered for transmission to the UE 410 once handover is complete. The serving cell 420 may also send a sequence number (SN) Status Transfer message to the target cell 430. The SN Status Transfer message may convey the uplink packet data Convergence Protocol (PDCP) SN receiver status and the downlink PDCP SN transmitter status of radio access bearers associated with the UE 410 for which PDCP status preservation applies.

After reception of the RRCConnectionReconfiguration message containing the handover command, the UE 410 may subsequently detach from the serving cell 420 and attach to the target cell 430. This process includes the UE 410 synchronizing to and accessing the target cell 430 using a random access channel (RACH) process after obtaining timing information from the target cell 430. The UE 410 may transmit a RRCConnectionReconfigurationComplete message containing a timing advance and other information (e.g., a new C-RNTI) to the target cell 430 when synchronization with the target cell 430 is complete. The target cell 430 may, in response to the RRCConnectionReconfigurationComplete message, transmit a confirmation of handover completion to acknowledge the connection with the UE 410.

The target cell 430 may begin sending data to the UE 410 and the UE 410 may transmit data to the target cell 430, which is then sent to the core network 440. In addition, after the target cell 430 determines that the UE 410 is able to communicate, the target cell 430 may transmit a path switch message to the core network 440 (e.g., MME in LTE/4G networks, AMF in 5G networks) to indicate that the cell serving the UE 410 has changed. The core network 440 may acknowledge the change in serving cell and the target cell 430 may send a UE context release command to the serving cell 420.

Thus, identification, address, channel, signal strength, security, Quality of Service (QoS) and other information may be communicated from the UE to the serving and/or target cell 430 to enable the target cell 430 to select the appropriate channel to use in communications with the UE. After the information is communicated, a communication link between the UE and target cell 430 may be established and subsequently, the existing communication link between the UE and the serving cell 420 may be torn down.

Figure 5:
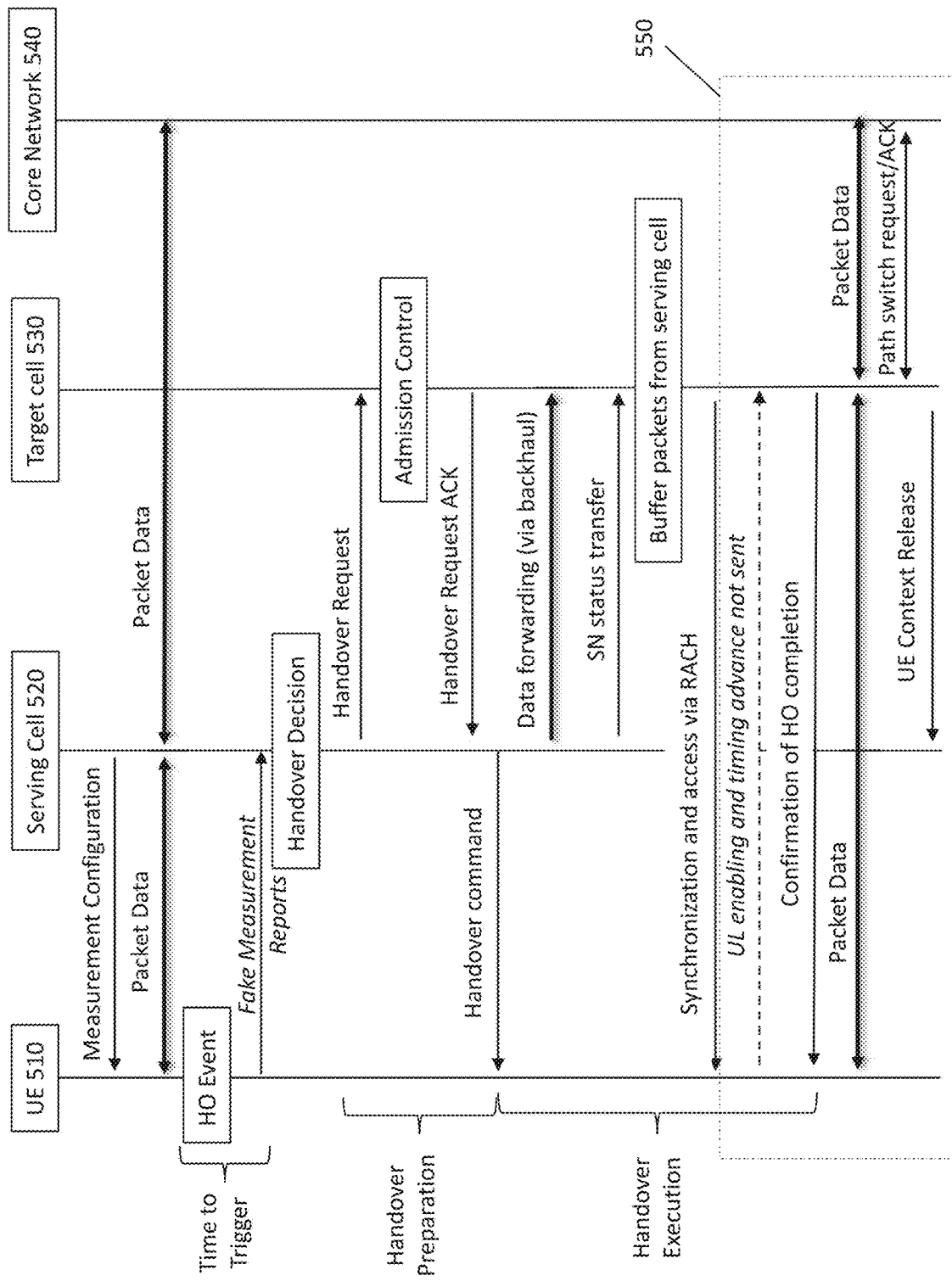
FIG. 5 illustrates a flow diagram of a HO process with fake HO indication in accordance with some aspects.

FIG. 5 illustrates a flow diagram of a HO process with a fake HO indication in accordance with some aspects. FIG. 5 is similar to the process in FIG. 4, with the UE 510, serving cell 520, target cell 530, and the core network 540 all providing the same communications as in FIG. 4, with several notable exceptions. In particular, rather than sending a measurement report (either at the predetermined reporting time or due to the occurrence of an event) that contains true measurements, the UE 510 may send fake measurements designed to trigger the serving cell 520 to decide to handover to the target cell 530. When the handover measurement report is received by the serving cell 520, the serving cell 520 starts to prepare the target cell 530 for handover and informs the core network 540 of the pending handover. During this preparation, the target cell 530 and the serving cell 520 allocate valuable communications and compute resources. For example, handover request, handover request acknowledgment, data forwarding, handover command, buffering packets from the serving cell 520, etc., all use resources.

Afterward transmission of the measurement report, the handover preparation and messages may remain the same until the serving cell 520 asks the UE 510 to perform non-contention based random access with the target cell 530 to obtain synchronization and complete the handover process. The serving cell 520 may send synchronization and access information to the UE 510, at which point the UE 510 may simply not respond. This may cause repeated transmissions of the synchronization and access information from the serving cell 520 until the handover process is terminated. Thus, none of the set of communications 550 shown in FIG. 5 may occur.

Alternatively, the UE 510 may respond to the synchronization and access information from the serving cell 520 and complete the handover process only to immediately retrigger handover using a new set of measurements in the measurement report. This new set of measurements may be selected by the UE 510 trigger handover back to the serving cell 520 or to another neighbor cell. In the latter case, the UE 510 may continue to trigger handover, e.g., from the other neighbor cell to the serving cell 520 or to the target cell 530 (also referred to herein as a multi-way ping-pong handover). The measurements transmitted may be real or may include fake measurements designed to trigger handover to a particular cell. Either of these cases wastes radio resources in serving cell 520 and target cell 530 and may prevent UEs from performing a genuine handover process by reserving limited resources for the fake handover. In other words, the UE 510 is performing a DOS attack on the genuine UEs.

Figure 6:
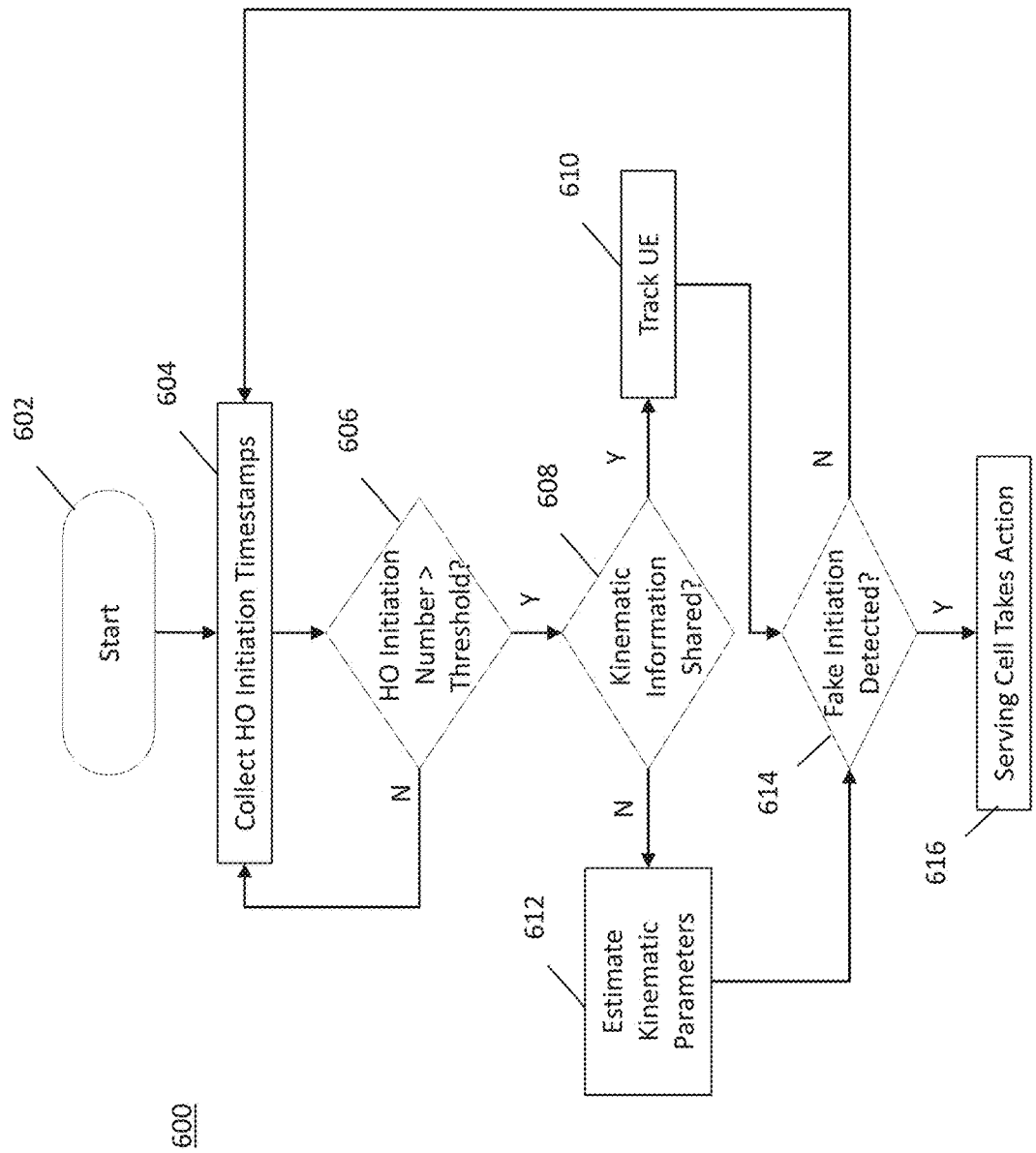
FIG. 6 illustrates a flow diagram of fake HO indication mitigation in accordance with some aspects.

To avoid these issues, the serving cell and/or core network may take mitigation procedures. FIG. 6 illustrates a flow diagram of fake handover indication mitigation in accordance with some aspects. Other operations may occur in the mitigation procedures but are not shown in FIG. 6 for convenience. After the start 602 of the mitigation process 600, at operation 604 the serving cell may collect timestamps of handover initiation between the serving cell and other neighbor cells. This collection may be continuous so that the timestamp of each handover initiation is stored. The timestamp may be matched to a particular UE (via a UE ID).

The serving cell may also maintain a counter of the number of times handover has been initiated for the UE at the serving cell within a predetermined amount of time. The serving cell may also obtain the number of times handover has been initiated for the UE within the predetermined amount of time among multiple neighboring cells. The amount of time may be rolling; that is, the time may be a predetermined amount of time measured from the latest handover initiation. The number (and in some cases timestamp) of handover initiated at neighboring cells may be obtained by the serving cell from the neighbor cells or from a central database (within the centralized unit or in the core network) in response to reception of a measurement report from the UE. The serving cell may use the number of handover initiations for the UE at operation 606 to determine whether the number exceeds a predetermined threshold. The threshold may be constant or may vary, e.g., dependent on loading (or expected loading) of the serving and/or target cell, the type of UE (e.g., IoT, vehicular, smartphone), environmental situation (e.g., rural/urban), expected QoS, etc. . . .

If at operation 606 the serving cell determines that the number of handover initiations for the UE does not exceed the threshold, the process 600 returns to collecting handover initiation timestamps at operation 604. If, however, the serving cell determines at operation 606 that the number of handover initiations for the UE exceeds the threshold, the process 600 continues dependent on whether or not the location and kinematic information of the UE are known to the serving cell, as determined at operation 608. The kinematic information may include instantaneous velocity (speed/direction of travel) of the UE. In some embodiments, the kinematic information may further include historic velocity/location information for the predetermined time. In this case, the UE may store the historic kinematic information and provide the historic kinematic information to the serving cell in response to a request triggered by the measurement report. Alternatively, the serving cell may track the kinematic information after an initial handover attempt by the UE or may request the historic kinematic information from an application server (e.g., Google Maps) that gathers such information.

At operation 610, the location and kinematic information of the UE are known to the serving cell. The UE may share the kinematic information in a minimization of drive test (MDT) application or other applications that use kinematic information with the serving base station. MDT captures various network performance (e.g., Cell Power, Interference) or UE performance (e.g., Call Drop, Throughput, Handover performance, Cell Reselection Performance etc) parameters along a certain route. To mitigate the potential threat posed by the UE, the serving base station may initiate a threat mitigation process. The serving cell starts collecting location information of the device. The serving cell may obtain the location information, for example, from the MDT application and/or other applications that use location/kinematic information (e.g., a mapping application). The serving cell may also start to track the UE and UE kinematic parameters, uplink signal strengths, and context to decide whether the handover is legitimate based on the UE location, traveling direction, speed, and other. In other embodiments, triangulation may be used to determine the UE location and parameters or from an external (non-network) database (e.g., Google Maps) via special request or estimate from received kinematic information.

At operation 612, the location and kinematic information of the UE is not known to the serving cell. To mitigate the potential UE threat, the serving and target cells collaboratively use physical (PHY) layer properties to verify the condition of the UE. In this case, the threat mitigation process may be initiated by both the serving and target cells. The physical layer properties (RSRP, Received Signal Strength Indicator (RSSI), angle of arrival (AoA), Doppler, etc.) of the received measurement report (or other signals) from the UE may be estimated at both the serving and target cells. The AoA can be calculated by measuring the time difference of arrival (TDOA) at the serving and target cells using the phase difference at each antenna in an array of each of the serving and target cells.

Thus, the AoAs of the UE signals may be tracked at both the serving and target cells and used, along with the distance between the serving and target cells, to calculate the location of the UE. The speed of the UE may also be estimated using Doppler. The reported RSRP measurements for handover may be verified collaboratively by the serving and target cells using estimated values. If the difference between the estimated RSRP measurements and the reported RSRP measurements is larger than an RSRP threshold, the serving and target cells may determine the handover initiation as not legitimate. This may also apply to RSRQ or BER measurements if used to determine handover. If multiple sets of measurements are used, in some embodiments, if any one, or a majority, of the measurements exceed the threshold related to that measurement, the serving and target cells may determine the handover initiation as not legitimate. Similar to operation 610, the serving and target cells start to track the UE and UE kinematic parameters, uplink signal strengths, and context to decide whether the handover is legitimate, based on the location and velocity of the UE, etc.

At operation 614, the serving cell determines based on the results of operation 610 or 612 with the handover initiation is warranted. If handover initiation is determined not to be fake, the serving cell continues with the handover process shown in FIG. 4 and returns to operation 604.

If handover initiation is determined to be fake, the serving cell may take one or more actions at operation 616. The actions may include that the serving cell will not initiate the handover process for the UE for a specified period of time. The specified period may be larger than the predetermined amount of time and may be dependent on, for example, network conditions (e.g., loading). In some embodiments, after the specified period of time, the serving cell may again permit the UE to initiate handovers until the threshold number is reached. In other embodiments, the serving cell may adjust the threshold number of handovers based on, in addition to the other factors discussed, an amount of time from the specified period, whether the UE has been re-authenticated by the core network, or whether other UEs have initiated fake handovers to the serving cell, among others. Alternatively, or in addition, the serving cell may request that the UE perform re-authentication with the core network or, in some cases, may recommend to the central authentication entity (MME/HSS for LTE, AMF for 5G) to revoke the authentication for the UE.

Figure 7:
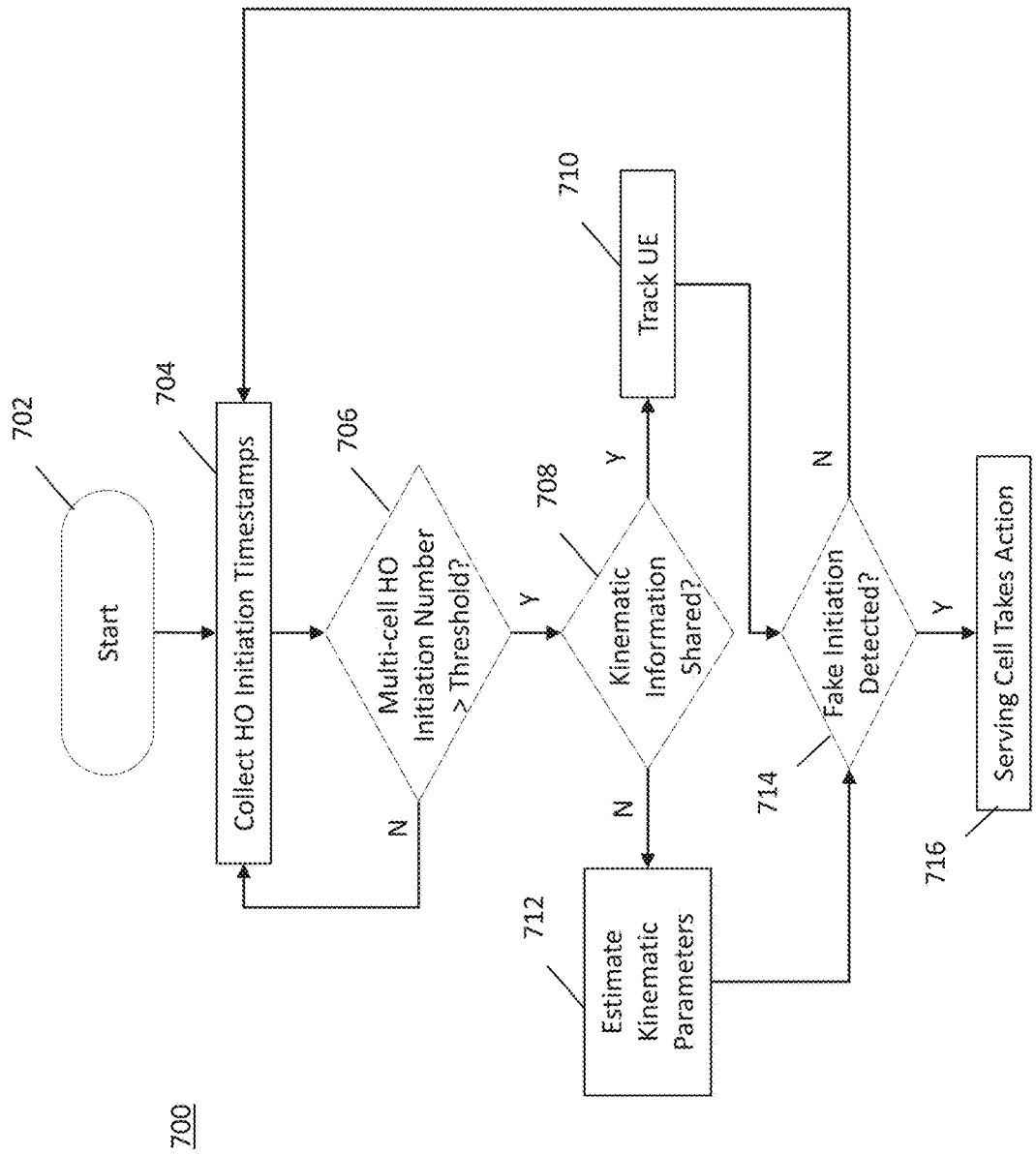
FIG. 7 illustrates another flow diagram of fake HO indication mitigation in accordance with some aspects.

FIG. 7 illustrates another flow diagram of fake HO indication mitigation in accordance with some aspects. The process 700 of FIG. 7 is similar to process 600 of FIG. 6. However, in this case, the UE may initiate the handover from the serving cell and successfully move onto the target cell. But, as soon as the handover is completed, the UE may reinitiate the handover process to return to the original cell, causing a ping pong effect and wasting a significant amount of radio resources in the serving and target cells. In some other situations, the UE may move from cell A to cell B, then from cell B to cell C, and then from cell C to cell A and continues this pattern.

As above, other operations may occur in the mitigation procedures but are not shown in FIG. 7 for convenience. After the start 702 of the mitigation process 700, at operation 704 the serving cell may collect timestamps of handover initiation between the serving cell and other neighbor cells. This collection may be continuous so that the timestamp of each handover initiation is stored. The timestamp may be matched to a particular UE (via a UE ID).

The serving cell may also maintain a counter of the number of times handover has been initiated for the UE at the serving cell within a predetermined amount of time. The serving cell may also obtain the number of times handover has been initiated for the UE within the predetermined amount of time among multiple neighboring cells. The amount of time may be rolling: that is, the time may be a predetermined amount of time measured from the latest handover initiation. The number (and in some cases timestamp) of handover initiated at neighboring cells may be obtained by the serving cell from the neighbor cells or from a central database (within the centralized unit or in the core network) in response to reception of a measurement report from the UE. The serving cell may use the number of handover initiations for the UE at operation 706 to determine whether the number exceeds a predetermined threshold. The threshold may be constant or may vary, e.g., dependent on loading (or expected loading) of the serving and/or target cell, the type of UE (e.g., IoT, vehicular, smartphone), environmental situation (e.g., rural/urban), expected QoS, etc. . . .

If at operation 706 the serving cell determines that the number of handover initiations for the UE does not exceed the threshold, the process 700 returns to collecting handover initiation timestamps at operation 704. If, however, the serving cell determines at operation 706 that the number of handover initiations for the UE exceeds the threshold, the process 700 continues dependent on whether or not the location and kinematic information of the UE are known to the serving cell, as determined at operation 708.

At operation 710, the location and kinematic information of the UE is known to the serving cell. The UE may share the kinematic information in an MDT application or other applications that use kinematic information with the serving base station. MDT captures various network performance (e.g., Cell Power, Interference) or UE performance (e.g., Call Drop, Throughput, Handover performance, Cell Reselection Performance etc.) parameters along a certain route. To mitigate the potential threat posed by the UE, the serving base station may initiate a threat mitigation process. The serving cell starts collecting location information of the device. The serving cell may obtain the location information, for example, from the MDT application and/or other applications that use location/kinematic information (e.g., a mapping application). The serving cell may also start to track the UE and UE kinematic parameters, uplink signal strengths, and context to decide whether the handover is legitimate based on the UE location, traveling direction, speed, and others. In other embodiments, triangulation may be used to determine the UE location and parameters or from an external (non-network) database (e.g., Google Maps) via special request or estimate from received kinematic information.

At operation 712, the location and kinematic information of the UE are not known to the serving cell. To mitigate the potential UE threat, the serving and target cells collaboratively use physical (PHY) layer properties to verify the condition of the UE. In this case, the threat mitigation process may be initiated by both the serving and target cells. The physical layer properties (RSRP, angle of arrival (AoA), Doppler, etc.) of the received measurement report (or other signals) from the UE may be estimated at both the serving and target cells. The AoA can be calculated by measuring the time difference of arrival (TDOA) at the serving and target cells using the phase difference at each antenna in an array of each of the serving and target cells.

Thus, the AoAs of the UE signals may be tracked at both the serving and target cells and used, along with the distance between the serving and target cells, to calculate the location of the UE. The speed of the UE may also be estimated using Doppler. The reported RSRP measurements for handover may be verified collaboratively by the serving and target cells using estimated values. If the difference between the estimated RSRP measurements and the reported RSRP measurements is larger than an RSRP threshold, the serving and target cells may determine the handover initiation as not legitimate. This may also apply to RSRQ or BER measurements if used to determine handover. If multiple sets of measurements are used, in some embodiments, if any one, or a majority, of the measurements exceed the threshold related to that measurement, the serving and target cells may determine the handover initiation as not legitimate. Similar to operation 710, the serving and target cells start to track the UE and UE kinematic parameters, uplink signal strengths, and context to decide whether the handover is legitimate, based on the location and velocity of the UE, etc.

At operation 714, the serving cell determines based on the results of operation 710 or 712 with the handover initiation is warranted. If handover initiation is determined not to be fake, the serving cell continues with the handover process shown in FIG. 4 and returns to operation 704.

If handover initiation is determined to be fake, the serving cell may take one or more actions at operation 716. The actions may include that the serving cell does not initiate the handover process for the UE for a specified period of time. The specified period may be larger than the predetermined amount of time and may be dependent on, for example, network conditions (e.g., loading). The serving cell may request that the UE perform re-authentication with the core network or, in some cases, may recommend to the central authentication entity (MME/HSS for LTE, AMF for 5G) to revoke the authentication for the UE.

Handover to Malicious Target Base Station

Rather than the UE being compromised, the cell may be problematic. That is, in some situations, the credentials of a genuine radio node (base station/small cell/roadside unit) may be cloned or stolen by a malicious actor to create a fake network access node. The fake access node may cause UEs to connect to the network via the fake access node. Once the UE has connected, the fake access node may be able to intentionally appropriate personal and valuable information from the UEs.

To mitigate this issue, access to genuine or uncompromised cells may be used. In general, the network operator may have access to all network nodes, including base stations, small/micro/nano/pico cells, roadside units (RSUs), etc. Each radio node has a different set of radio frequency (RF) impairments, which may include one or more of a frequency offset, transmit bandpass or lowpass filter response, ramp/transient, amplitude offset, and power amplifier characteristics. The RF impairments occur due to variations in the manufacturing process. The RF impairments for each network node may be determined based on multiple signals transmitted by the network node, which may be determined after manufacturing before installation or after installation in the field. The RF impairments may be cataloged and used as RF fingerprints of the network nodes.

In some embodiments, an artificial intelligence (AI) model such as a deep neural network (DNN) or other models may be trained to classify both known and unknown nodes. In some embodiments, the AI model is deployed at UEs and network nodes having sufficient processing power to implement the AI model.

In some embodiments, when the handover is completed, the UE may use the AI model to classify the network node as either a known or unknown device. When the network node is classified by the AI model as a known device (the AI outcome is known), the UE may confirm connection to a genuine node and thus determine that data communicated through the network node is secure.

The UE may send the AI outcome in a non-access stratum (NAS) message to the network entity responsible for authentication. The NAS message may be a new NAS message or may be a new parameter in an existing NAS message. As above, the network entity responsible for authentication in an LTE network is the MME and in a 5G network is the AMF. The network entity responsible for authentication may then confirm the identity of the target network node. Due to the incorporation of the AI outcome in the NAS message, the network node (whether genuine or malicious) may be unable to alter the NAS message, and thus the AI outcome. In some embodiments, the presence of the NAS message alone may indicate that the AI outcome is that the network node is unknown (or fake). The NAS message may provide the identity of the network node, either in within the message or merely based on the network node from which the transmission to the network entity responsible for authentication is received.

In response to the AI outcome indicating an unknown/fake network node, the network entity responsible for authentication may remove the unknown/fake network node from the network. In some embodiments, the network entity responsible for authentication may remove the unknown/fake network node from the network by removing the unknown/fake network node from a list of network nodes that are acceptable/genuine and send an update to UEs and other network nodes in the vicinity of the unknown/fake network node to avoid the use of/ignore transmissions from the unknown/fake network node. The AI model may similarly be updated.

In some embodiments, the UE may initiate another handover process to the original serving cell or another neighbor cell in response to the reception of the update, ignoring the unknown/fake network node. This permits the other network nodes and UEs to engage in handover while ignoring the reference signals from the unknown/fake network node (and thus saving computational power-related, e.g., to compare the RSRP of the reference signals to that of another RSRP).

In other embodiments, the AI model may be centrally located, with the RF fingerprint of the target network node to which the UE is to handover (or has been handed over prior to the UE context release) determined by the UE sent to a network node that has been previously confirmed as a valid network node (e.g., the serving cell). The serving cell may then determine whether the target network node is valid or may transmit the RF fingerprint to a server of the core network (or elsewhere) to make the determination. This may permit a determination to be made prior to the target network node sending packets of the UE to the target network node to buffer.

If transmitted, the RF fingerprint may be provided as a series of data elements that each indicate a range of values for a respective RF impairment. The range of values for each RF impairment may be determined based on, for example, the overall size of the RF impairment, the number of RF impairments, and/or the size of the message.

6.5 AI/ML Model for Learning HO Behavior and Predicting Misbehaviors

In some embodiments, the network nodes collect the device locations and the serving base station IDs over multiple periods. The network operator may train the AI model with the collected data and use the AI model to predict the best serving cell for a given UE location. If a serving cell determines that the UE has initiated multiple handovers with the serving cell, whether complete or incomplete, within a predetermined amount of time, or has repeatedly engaged in multi-way ping-pong handover within the predetermined amount of time, the serving cell may use the AI model to infer the best serving cell for the UE location. The AI model may then predict whether the handover is a fake handover by determining that the target cell is different from the best serving cell at the UE position. In response, the serving cell may initiate the mitigation process described above.

The AI model may, in addition to using the UE location, also obtain and use the UE speed, as well as environmental conditions that include the time of the day, network conditions (e.g., cell loading), and weather conditions, for example, as inputs for predicting the appropriate serving cell. In some embodiments, each network node may generate a set of tables linking the best serving cell parameters to the particular serving cell or linking the best serving cell parameters only for itself. In other embodiments, a table may be shared among multiple network nodes. In some embodiments, only a subset of the network nodes (e.g., base stations) may collect the UE locations.

The physical layer properties-based mitigation schemes described herein have a number of properties, including transparency to the client-side without using additional hardware for implementation; the schemes may be implemented on software based on measurements available from the lower layers. Moreover, adjustment to the current standards and additional standardization may be avoided.

Examples

Example 1 is an apparatus for a serving network node, the apparatus comprising: processing circuitry configured to: decode a measurement report from a user equipment (UE) served by the serving network node; determine that the UE is to handover to a target network node based on the measurement report; determine whether the UE has initiated handover greater than a threshold number of times in a predetermined amount of time; initiate handover of the UE to the target network node in response to a determination that the UE has not initiated handover greater than the threshold number of times in the predetermined amount of time; in response to a determination that the UE has initiated handover greater than the threshold number of times in the predetermined amount of time, determine whether initiation of the handover to the target network node is legitimate based on physical (PHY) layer properties that include, UE parameters; and in response to a determination that initiation of the handover is not legitimate, terminate the handover and deny additional handover attempts by the UE for a set amount of time; and a memory configured to store the threshold number of times.

In Example 2, the subject matter of Example 1 includes that the processing circuitry is configured to determine the UE parameters, which include location information, kinematic parameters, uplink signal strengths, and context information of the UE.

In Example 3, the subject matter of Example 2 includes that to determine whether initiation of the handover to the target network node is legitimate, the processing circuitry is configured to collect the kinematic information from the UE in a minimization of drive test (MDT) application.

In Example 4, the subject matter of Examples 1-3 includes that to determine whether initiation of the handover to the target network node is legitimate, the processing circuitry is configured to: estimate serving cell physical layer properties of the UE from signals from the UE to obtain estimated serving cell physical layer properties, obtain, from the target network node, estimated target cell physical layer properties of the UE from the signals from the UE, estimate UE measurements based on the estimated serving and target cell physical layer properties to obtain estimated UE measurements, compare the estimated UE measurements to measurements in the measurement report, and determine that initiation of the handover is not legitimate in response to a determination that a difference between the estimated UE measurements and the measurements in the measurement report are greater than a measurement threshold.

In Example 5, the subject matter of Example 4 includes that: the estimated serving cell physical layer properties and target cell physical layer properties include estimated Reference Signal Received Power (RSRP), angle of arrival (AoA), and Doppler information, and the processing circuitry is further configured to: estimate RSRP based on a location and speed of the UE to obtain an estimated RSRP of the estimated serving cell physical layer properties, obtain, from the target network node, an estimated RSRP of the estimated target cell physical layer properties, compare each of the estimated RSRP of the estimated serving cell physical layer properties and target cell physical layer properties to a corresponding RSRP in the measurement report to determine whether a difference between either the RSRP of the estimated serving cell physical layer properties or target cell physical layer properties and the corresponding RSRP in the measurement report is greater than the measurement threshold, and determine that initiation of the handover is not legitimate in response to a determination that the difference between either the RSRP of the estimated serving cell physical layer properties or target cell physical layer properties and the corresponding RSRP in the measurement report is greater than the measurement threshold.

In Example 6, the subject matter of Example 5 includes that the processing circuitry is further configured to: track the AoA of the estimated serving cell physical layer properties and target cell physical layer properties to estimate the location of the UE based on the AoA of the estimated serving cell physical layer properties and target cell physical layer properties and a distance between the serving network node and target network node, and estimate the speed of the UE based on the Doppler information.

In Example 7, the subject matter of Examples 1-6 includes that in response to a determination that initiation of the handover is not legitimate, the processing circuitry is further configured to track kinematic information, uplink signal strength, and UE context information of the UE during the set amount of time.

In Example 8, the subject matter of Examples 1-7 includes that in response to a determination that initiation of the handover is not legitimate, the processing circuitry is further configured to encode, for transmission to the UE, instructions for the UE to perform re-authentication with a core network with which the serving network node is associated.

In Example 9, the subject matter of Examples 1-8 includes that in response to a determination that initiation of the handover is not legitimate, the processing circuitry is further configured to encode, for transmission to an authentication entity in a core network with which the serving network node is associated, a recommendation for the authentication entity to revoke authentication of the UE.

In Example 10, the subject matter of Examples 1-9 includes that the processing circuitry is configured to count handovers only between the serving network node and the target network node to determine whether the UE has initiated handover greater than the threshold number of times.

In Example 11, the subject matter of Examples 1-10 includes that the processing circuitry is configured to count handovers among the serving network node and neighboring network nodes of the serving network node to determine whether the UE has initiated handover greater than the threshold number of times.

In Example 12, the subject matter of Examples 1-11 includes that: the UE parameters comprise a location of the UE, and the processing circuitry is configured to in response to a determination that the UE has initiated handover greater than the threshold number of times in the predetermined amount of time, determine a best serving network node for the UE to determine whether initiation of the handover to the target network node is legitimate, the best serving network node dependent on the location of the UE.

In Example 13, the subject matter of Example 12 includes that: the UE parameters further comprise speed of the UE and environmental conditions, and the processing circuitry is configured to use an artificial intelligence (AI) model that is trained to classify network nodes based on the UE parameters to determine the best serving network node for the UE.

Example 14 is an apparatus for a user equipment (UE), the apparatus comprising: processing circuitry configured to: encode, for transmission to a serving network node, a measurement report containing measurements of reference signals transmitted by the serving network node and neighbor network nodes; decode, from the serving network node in response to transmission of the measurement report, a handover command to handover to a target network node of the neighbor network nodes; in response to reception of the handover command, execute handover to the target network node; after completion of handover to the target network node, determine whether the target network node is a known or unknown network device based on radio frequency (RF) impairments of the target network node, the RF impairments determined from reception of signals from the target network node; and generate a non-access stratum (NAS) message to an authentication entity in a core network to which the target network node is connected, the NAS message containing a determination of whether the target network node is an unknown network device: and a memory configured to store.

In Example 15, the subject matter of Example 14 includes that the RF impairments comprise, for a particular signal, a frequency offset, transmit bandpass or lowpass filter response, a ramp or transient, amplitude offset, and power amplifier characteristic.

In Example 16, the subject matter of Example 15 includes that the processing circuitry is configured to use an artificial intelligence (AI) model that is trained to classify network nodes based on the RF impairments.

In Example 17, the subject matter of Examples 15-16 includes that the processing circuitry is configured to: encode, to another UE, a request to classify the target network node using an artificial intelligence (AI) model that is trained to classify network nodes based on the RF impairments, the request containing the RF impairments, and decode, from the other UE in response to the request, an indication of whether the target network node is an unknown network device.

In Example 18, the subject matter of Examples 14-17 includes that the processing circuitry is configured to, in response to transmission of a NAS message indicating that the target network node is an unknown network device, initiate handover to another network node and ignore signals from the target network node.

Example 19 is a non-transitory computer-readable storage medium that stores instructions for execution by one or more processors of a serving network node, the one or more processors to configure the serving network node to, when the instructions are executed: determine that a user equipment (UE) served by the serving network node is to handover to a target network node; determine, in response to a determination that the UE is to handover to the target network node, whether the UE has initiated handover greater than a threshold number of times in a predetermined amount of time: in response to a determination that the UE has initiated handover greater than the threshold number of times in the predetermined amount of time, determine whether initiation of the handover to the target network node is legitimate based on UE parameters that include, location information, kinematic parameters, uplink signal strengths, and context information; and in response to a determination that initiation of the handover is not legitimate, terminate the handover and deny additional handover attempts by the UE for a set amount of time.

In Example 20, the subject matter of Example 19 includes that the instructions when executed further configure the one or more processors to, in response to a determination that initiation of the handover is not legitimate, at least one of: track the UE parameters during the set amount of time, encode, for transmission to the UE, instructions for the UE to perform re-authentication with a core network to which the serving network node is connected, or encode, for transmission to an authentication entity in the core network, a recommendation for the authentication entity to revoke authentication of the UE.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a serving network node, the apparatus comprising:
    processing circuitry configured to:
        decode a measurement report from a user equipment (UE) served by the serving network node;
        determine that the UE is to handover to a target network node based on the measurement report;
        determine whether the UE has initiated handover greater than a threshold number of times in a predetermined amount of time;

initiate handover of the UE to the target network node in response to a determination that the UE has not initiated handover greater than the threshold number of times in the predetermined amount of time;
in response to a determination that the UE has initiated handover greater than the threshold number of times in the predetermined amount of time, determine whether initiation of the handover to the target network node is legitimate based on physical (PHY) layer properties that include UE parameters; and
in response to a determination that initiation of the handover is not legitimate, terminate the handover and deny additional handover attempts by the UE for a set amount of time; and
a memory configured to store the threshold number of times.

2. The apparatus of claim 1, wherein the processing circuitry is configured to determine the UE parameters, which include location information, kinematic parameters, uplink signal strengths, and context information of the UE.

3. The apparatus of claim 2, wherein to determine whether initiation of the handover to the target network node is legitimate, the processing circuitry is configured to collect the kinematic parameters from the UE in a minimization of drive test (MDT) application.

4. The apparatus of claim 1, wherein to determine whether initiation of the handover to the target network node is legitimate, the processing circuitry is configured to:
estimate serving cell physical layer properties of the UE from signals from the UE to obtain estimated serving cell physical layer properties,
obtain, from the target network node, estimated target cell physical layer properties of the UE from the signals from the UE,
estimate UE measurements based on the estimated serving and target cell physical layer properties to obtain estimated UE measurements,
compare the estimated UE measurements to measurements in the measurement report, and
determine that initiation of the handover is not legitimate in response to a determination that a difference between the estimated UE measurements and the measurements in the measurement report are greater than a measurement threshold.

5. The apparatus of claim 4, wherein:
the estimated serving cell physical layer properties and target cell physical layer properties include estimated Reference Signal Received Power (RSRP), angle of arrival (AoA), and Doppler information, and
the processing circuitry is further configured to:
estimate RSRP based on a location and speed of the UE to obtain an estimated RSRP of the estimated serving cell physical layer properties,
obtain, from the target network node, an estimated RSRP of the estimated target cell physical layer properties,
compare each of the estimated RSRP of the estimated serving cell physical layer properties and target cell physical layer properties to a corresponding RSRP in the measurement report to determine whether a difference between either the RSRP of the estimated serving cell physical layer properties or target cell physical layer properties and the corresponding RSRP in the measurement report is greater than the measurement threshold, and
determine that initiation of the handover is not legitimate in response to a determination that the difference between either the RSRP of the estimated serving cell physical layer properties or target cell physical layer properties and the corresponding RSRP in the measurement report is greater than the measurement threshold.

6. The apparatus of claim 5, wherein the processing circuitry is further configured to:
track the AoA of the estimated serving cell physical layer properties and target cell physical layer properties to estimate the location of the UE based on the AoA of the estimated serving cell physical layer properties and target cell physical layer properties and a distance between the serving network node and target network node, and
estimate the speed of the UE based on the Doppler information.

7. The apparatus of claim 1, wherein in response to a determination that initiation of the handover is not legitimate, the processing circuitry is further configured to track kinematic information, uplink signal strength, and UE context information of the UE during the set amount of time.

8. The apparatus of claim 1, wherein in response to a determination that initiation of the handover is not legitimate, the processing circuitry is further configured to encode, for transmission to the UE, instructions for the UE to perform re-authentication with a core network with which the serving network node is associated.

9. The apparatus of claim 1, wherein in response to a determination that initiation of the handover is not legitimate, the processing circuitry is further configured to encode, for transmission to an authentication entity in a core network with which the serving network node is associated, a recommendation for the authentication entity to revoke authentication of the UE.

10. The apparatus of claim 1, wherein the processing circuitry is configured to count handovers only between the serving network node and the target network node to determine whether the UE has initiated handover greater than the threshold number of times.

11. The apparatus of claim 1, wherein the processing circuitry is configured to count handovers among the serving network node and neighboring network nodes of the serving network node to determine whether the UE has initiated handover greater than the threshold number of times.

12. The apparatus of claim 1, wherein:
the UE parameters comprise a location of the UE, and
the processing circuitry is configured to in response to a determination that the UE has initiated handover greater than the threshold number of times in the predetermined amount of time, determine a best serving network node for the UE to determine whether initiation of the handover to the target network node is legitimate, the best serving network node dependent on the location of the UE.

13. The apparatus of claim 12, wherein:
the UE parameters further comprise speed of the UE and environmental conditions, and
the processing circuitry is configured to use an artificial intelligence (AI) model that is trained to classify network nodes based on the UE parameters to determine the best serving network node for the UE.

14. An apparatus for a user equipment (UE), the apparatus comprising:
processing circuitry configured to:
encode, for transmission to a serving network node, a measurement report containing measurements of reference signals transmitted by the serving network node and neighbor network nodes;

decode, from the serving network node in response to transmission of the measurement report, a handover command to handover to a target network node of the neighbor network nodes;

in response to reception of the handover command, execute handover to the target network node;

after completion of handover to the target network node, determine whether the target network node is a known or unknown network device based on radio frequency (RF) impairments of the target network node, the RF impairments determined from reception of signals from the target network node; and generate a non-access stratum (NAS) message to an authentication entity in a core network to which the target network node is connected, the NAS message containing a determination of whether the target network node is an unknown network device; and a memory configured to store the NAS message.

15. The apparatus of claim 14, wherein the RF impairments comprise, for a particular signal, a frequency offset, transmit bandpass or lowpass filter response, a ramp or transient, amplitude offset, and power amplifier characteristic.

16. The apparatus of claim 15, wherein the processing circuitry is configured to use an artificial intelligence (AI) model that is trained to classify network nodes based on the RF impairments.

17. The apparatus of claim 15, wherein the processing circuitry is configured to:

encode, to another UE, a request to classify the target network node using an artificial intelligence (AI) model that is trained to classify network nodes based on the RF impairments, the request containing the RF impairments, and decode, from the other UE in response to the request, an indication of whether the target network node is an unknown network device.

18. The apparatus of claim 14, wherein the processing circuitry is configured to, in response to transmission of a NAS message indicating that the target network node is an unknown network device, initiate handover to another network node and ignore signals from the target network node.

19. A non-transitory computer-readable storage medium that stores instructions for execution by one or more processors of a serving network node, the one or more processors to configure the serving network node to, when the instructions are executed:

determine that a user equipment (UE) served by the serving network node is to handover to a target network node;

determine, in response to a determination that the UE is to handover to the target network node, whether the UE has initiated handover greater than a threshold number of times in a predetermined amount of time;

in response to a determination that the UE has initiated handover greater than the threshold number of times in the predetermined amount of time, determine whether initiation of the handover to the target network node is legitimate based on UE parameters that include location information, kinematic parameters, uplink signal strengths, and context information; and in response to a determination that initiation of the handover is not legitimate, terminate the handover and deny additional handover attempts by the UE for a set amount of time.

20. The medium of claim 19, wherein the instructions when executed further configure the one or more processors to, in response to a determination that initiation of the handover is not legitimate, at least one of:

track the UE parameters during the set amount of time, encode, for transmission to the UE, instructions for the UE to perform re-authentication with a core network to which the serving network node is connected, or encode, for transmission to an authentication entity in the core network, a recommendation for the authentication entity to revoke authentication of the UE.

* * * * *